(12) United States Patent
Shu et al.

(10) Patent No.: US 12,505,178 B2
(45) Date of Patent: Dec. 23, 2025

(54) MANAGING METADATA SWITCHES AND PLATFORM LICENSES IN A DISTRIBUTED SYSTEM

(71) Applicant: Salesforce, Inc., San Francisco, CA (US)

(72) Inventors: Gang Shu, South San Francisco, CA (US); Susan Levine, Redwood City, CA (US); Anthony Lai, Redwood City, CA (US); Billy Ma, Berkeley, CA (US)

(73) Assignee: Salesforce, Inc., San Francisco, CA (US)

( * ) Notice: Subject to any disclaimer, the term of this patent is extended or adjusted under 35 U.S.C. 154(b) by 37 days.

(21) Appl. No.: 18/136,744

(22) Filed: Apr. 19, 2023

(65) Prior Publication Data

US 2024/0354377 A1    Oct. 24, 2024

(51) Int. Cl.
*G06F 21/10*    (2013.01)

(52) U.S. Cl.
CPC .......... *G06F 21/105* (2013.01); *G06F 21/107* (2023.08)

(58) Field of Classification Search
CPC ......... G06F 8/64; G06F 21/105; G06F 21/107
See application file for complete search history.

(56) References Cited

U.S. PATENT DOCUMENTS

| | | | | |
|---|---|---|---|---|
| 11,336,732 B1 * | 5/2022 | Danilchenko | ....... | H04L 67/1095 |
| 11,449,581 B2 * | 9/2022 | Kapoor | ................ | G06F 21/51 |
| 2004/0199760 A1 * | 10/2004 | Mazza | ................ | G06F 21/1073 |
| | | | | 713/150 |
| 2011/0061047 A1 * | 3/2011 | Tyamagondlu | ....... | G06F 21/105 |
| | | | | 717/177 |
| 2014/0282358 A1 * | 9/2014 | Mowatt | ..................... | G06F 8/70 |
| | | | | 717/104 |
| 2016/0203301 A1 * | 7/2016 | Ooki | ..................... | G06Q 50/184 |
| | | | | 705/59 |
| 2017/0169195 A1 * | 6/2017 | LiSanti | ................... | H04L 67/06 |
| 2018/0018745 A1 * | 1/2018 | Lisanti | ................ | G06Q 50/184 |
| 2021/0073354 A1 * | 3/2021 | Tyagi | ................. | G06F 11/3668 |
| 2021/0240799 A1 * | 8/2021 | Wong | ...................... | G06F 21/10 |
| 2023/0229743 A1 * | 7/2023 | Diehl | .................... | H04L 9/0869 |
| | | | | 713/193 |
| 2023/0281278 A1 * | 9/2023 | Fernandez Garcia | ...................... | |
| | | | | G06F 21/105 |
| | | | | 705/59 |
| 2024/0273166 A1 * | 8/2024 | Pancholi | ................ | G06Q 50/08 |
| 2025/0217516 A1 * | 7/2025 | Yarbrough | ............ | G06F 21/629 |

FOREIGN PATENT DOCUMENTS

| | | | | | |
|---|---|---|---|---|---|
| CN | 110325992 A | * | 10/2019 | ......... | G06F 9/44505 |
| CN | 117633727 A | * | 3/2024 | .......... | G06F 21/602 |

* cited by examiner

*Primary Examiner* — Christopher A Revak
(74) *Attorney, Agent, or Firm* — Sterne, Kessler, Goldstein & Fox P.L.L.C.

(57) ABSTRACT

System and methods are presented for configuring and managing metadata switches and platform licenses in a distributed system. Using metadata switches, a platform license can be developed for a software product without the need for an engineer to develop the platform license by hand. A software application depot can be used to configure metadata switches that provide configuration information for a particular aspect of the software product and, when associated to a platform license that utilizes metadata switches, generate an accessible platform license for use by tenant organizations.

20 Claims, 9 Drawing Sheets

```xml
<?xml version="1.0" encoding="UTF-8"?>
<PlatformLicenseDefinition>
    <fullName>EasifiedExperience-1</fullName>
    <description>Easified experience for SMB customers</description>
    <cloudServiceProvider>force.com</cloudServiceProvider>
    <minPlatformVersion>230</minPlatformVersion>

<!-- Social Login (aka social single sign-on) -->
    <settingItems>
        <durableId>orgPermission.SocialLogin</durableId>
        <value>true</value>
    </settingItems>

<!-- Quick Setup Panel -->
    <settingItems>
        <durableId>orgPermission.QuickSetupPanel</durableId>
        <value>true</value>
    </settingItems>

<!-- In-App Live Chat -->
    <settingItems>
        <durableId>orgPermission.ChatBubble</durableId>
        <value>true</value>
    </settingItems>

<!-- Data Import Wizard v2 -->
    <settingItems>
        <durableId>orgPermission.DataImportV2</durableId>
        <value>true</value>
    </settingItems>

<!-- Easified Home page -->
    <settingItems>
        <durableId>orgPermission.EasifiedHomePage</durableId>
        <value>true</value>
    </settingItems>
```

::: Salesforce Home Chatter News Groups ∨VZMOM People ∨Reports ∨Dashboards ∨Accounts ∨Opportunities ∨Forecasts Campaigns ∨More ▸

Product License Maps

All ProductLicenseMaps ▸ ☒    New | Open in Quip

50+ items • Sorted by Name • Filtered by All product license maps • Updated a few seconds ago    ☆▾ | C | ✎ | ▽

600

| | | Name ↑ | Product | 602 ∨ | License Definition | 604 ∨ | Quantity ∨ | |
|---|---|---|---|---|---|---|---|---|
| 1 | ☐ | PL-041 | Sales Cloud - Performance Edition Limited | | ChatbotSession | | 25 | ▸ |
| 2 | ☐ | PL-042 | Service Cloud - Performance Edition (Spanish) | | Flow Sites | | 1 | ▸ |
| 3 | ☐ | PL-043 | Service Cloud - Performance Edition (Simplified Chinese) | | Knowledge User | | 1 | ▸ |
| 4 | ☐ | PL-044 | Database.com (100 Lite Users) | | Additional DB.com Light User | | 100 | ▸ |
| 5 | ☐ | PL-045 | Radian6 for Marketing Cloud - Basic | | Radian6 Additional Marketing Cloud Users | | 1,0 | ▸ |
| 6 | ☐ | PL-046 | Pardot - Email - Dedicated IP Address | | PardotDedicatedip | | 1 | ▸ |
| 7 | ☐ | PL-047 | Force.com - Enterprise Edition (One App) | | ForceDotComOneApp | | 1 | ▸ |
| 8 | ☐ | PL-048 | Retail Execution - Contractor - Enterprise Edition | | Offline User | | 1 | ▸ |
| 9 | ☐ | PL-049 | Health Cloud Sales - Unlimited Edition | | WaveHCEmbeddedApp | | 5 | ▸ |
| 10 | ☐ | PL-050 | Force.com - Enterprise Edition (Enterprise Apps - | | Apps20AndTabs65 | | 1 | ▸ |
| 11 | ☐ | PL-051 | Pardot - Advanced - LP | | PardotSocialProfiles | | 1 | ▸ |
| 12 | ☐ | PL-052 | Pardot - Sales Cloud Features - Advanced - LP | | PardotSCFeaturesCampaignInfluence | | 1 | ▸ |
| 13 | ☐ | PL-053 | Government Case Connect - Unlimited Edition | | ChatbotSession | | 25 | ▸ |
| 14 | ☐ | PL-054 | Offline | | Offline User | | 1 | ▸ |
| 15 | ☐ | PL-055 | Force.com - Enterprise Edition | | Interaction User | | 1 | ▸ |

FIG. 6

MANAGING METADATA SWITCHES AND PLATFORM LICENSES IN A DISTRIBUTED SYSTEM

BACKGROUND

Platform licenses are an integral aspect of software products that provide contractual agreements between managing and tenant organizations. A platform license often includes a large number of features and is complex because it controls the functionality of a software product. Current platform licensing methods rely on developers to configure features of a software product by hand to comply with a platform license. Engineers must also be able to implement all additions, deletions, and updates of features in a software product while developing a new platform license. This current process may take several months to complete and even more time for review and finalization of the product.

Because of the time and labor associated with platform license development, platform licenses are challenging to develop on a large scale to accommodate the individual needs of every tenant organization. Therefore, approaches are needed to efficiently allow an organization to craft its own platform licenses with little to no assistance from developers.

BRIEF DESCRIPTION OF THE DRAWINGS

The accompanying drawings, which are incorporated herein and form a part of the specification.

FIG. 3 depicts an example of a platform license configured with metadata switches, according to some aspects.

FIG. 5A-C depict example user interfaces usable to retrieve user input for a platform license, according to some aspects.

FIG. 6 depicts an example of a user interface that displays final platform license records and corresponding stock keeping units, according to some aspects.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method, computer program product embodiments, and/or combinations thereof, for configuring and managing metadata switches and platform licenses in a distributed system. In the detailed description that follows, references to "one aspect", "an aspect", "an example aspect", etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to effect such feature, structure, or characteristic in connection with other aspects whether or not explicitly described.

As used in describing embodiments disclosed herein, licenses may include contractual agreements between a managing organization and a tenant organization, which includes a metadata description of the functionality for the associated software product that is available to the tenant organization. Platform licenses include licenses used by managing organizations of a software product to control functionality of said software product for a tenant organization. Using metadata switches, a platform license can be developed for a software product without the need for an engineer to develop the platform license by hand. A software application depot can be used to configure metadata switches that provide configuration information for a particular aspect of the software product and, when associated to a platform license that utilizes metadata switches, generate an accessible platform license for use by tenant organizations. These and other technological advantages are described herein.

Figure 1:
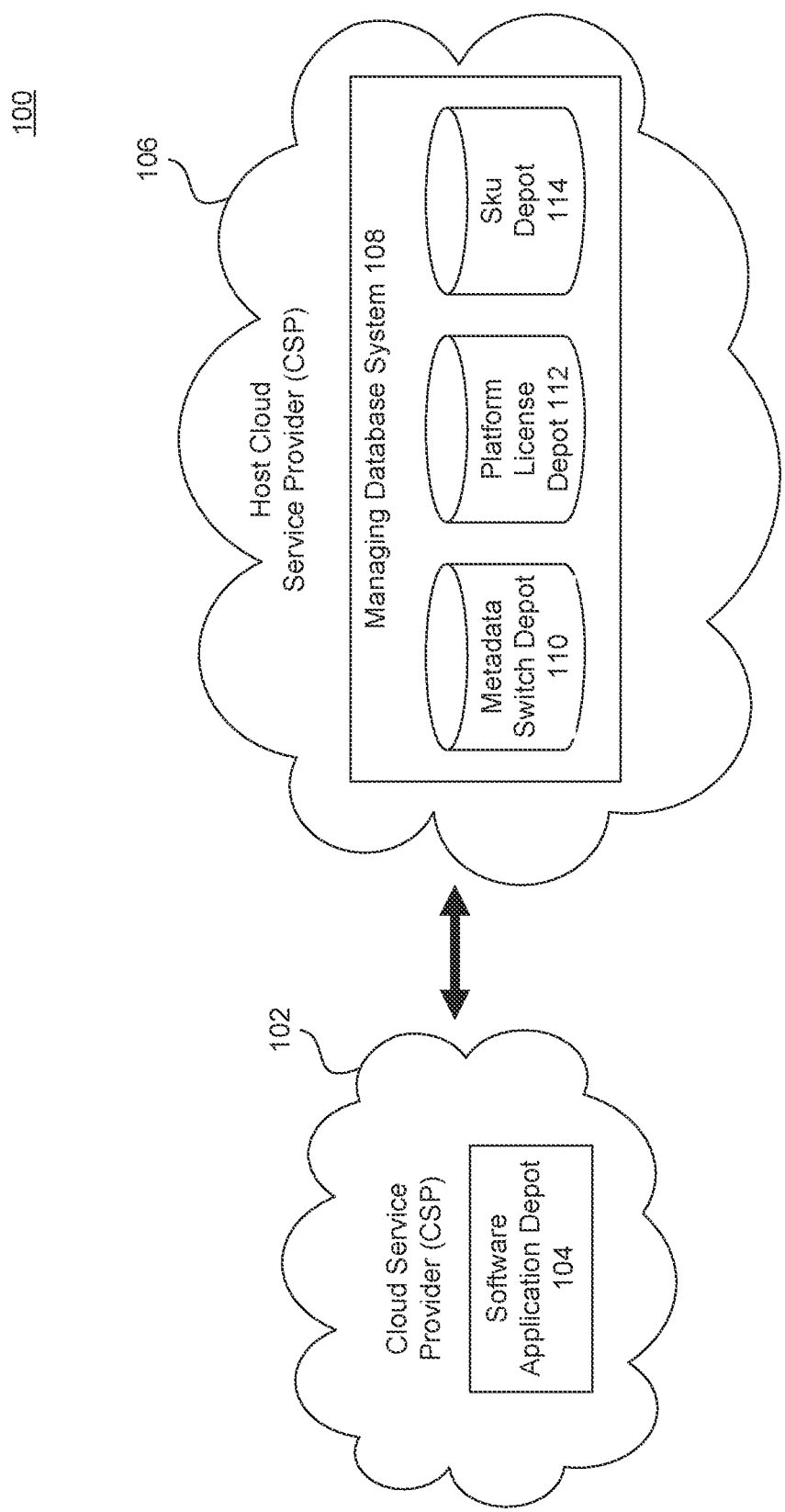
FIG. 1 is a diagram of a system for configuring and managing metadata switches and platform licenses in a cloud based computing environment, according to some aspects.

FIG. 1 shows a system 100, according to some aspects. For example, system 100 can be used for managing metadata switches and platform licenses in a cloud based computing environment. In one example, system 100 comprises a cloud service provider (CSP) 102 and a host cloud service provider (host CSP) 106. In one example, CSP 102 comprises a software application depot 104. In one example, host CSP 106 comprises a managing database system 108. In one example, managing database system 108 comprises a metadata switch depot 110, a platform license depot 112, and a stock keeping unit (SKU) depot 114.

In some embodiments, CSP 102 can be an entity that provides components of cloud computing, e.g., infrastructure, software, storage, platform, or the like as a service.

In some embodiments, software application depot 104 can be a code repository that centralizes, stores, and manages code for a software application or plurality of software applications. In one example, metadata switches can be configured and managed in software application depot 104 by a backend engineer. Software application depot 104 can also associate metadata switches to platform licenses.

In some embodiments, host CSP 106 can be an entity that provides components of cloud computing, e.g., infrastructure, software, storage, platform, or the like as a service.

In some aspects, software application depot 104 is hosted by CSP 102. In some aspects, CSP 102 can be a different cloud service provider than host CSP 106. CSP 102 is configured to securely communicate with host CSP 106.

In some embodiments, managing database system 108 can be database system that includes databases that store application code, object data, tables, datasets, and database records. Managing database system 108 may be a relational or a non-relational database system. Managing database system 108 can include a plurality of hardware, software, and logic elements that facilitate database system functionality and code execution.

In some embodiments, metadata switch depot 110 is a repository that stores a record of a metadata switch or a plurality of metadata switches provided by software application depot 104. Metadata switch depot 110 may be a relational or a non-relational database.

In some embodiments, platform license depot 112 is a repository that stores a record of a platform license or a plurality of platform licenses. Platform license depot 112 may be a relational or a non-relational database. The record of the platform license stored in platform license depot 112 may be associated to metadata switches in metadata switch depot 110.

In some embodiments, SKU depot 114 is a repository that stores SKUs that may be assigned to a record to make the record available for purchase. SKU depot 112 may be a relational or a non-relational database. In one example, SKUs stored in SKU depot 114 may be assigned to a record of a platform license stored in platform license depot 112 to make the platform license available for purchase.

It is to be appreciated that system 100 is merely an example of one suitable system environment and is not intended to suggest any limitations as to the scope of use or functionality of aspects described herein. Neither should system 100 be interpreted as having any dependency or requirement related to any single module/component or combination of modules/components described therein.

Figure 2:
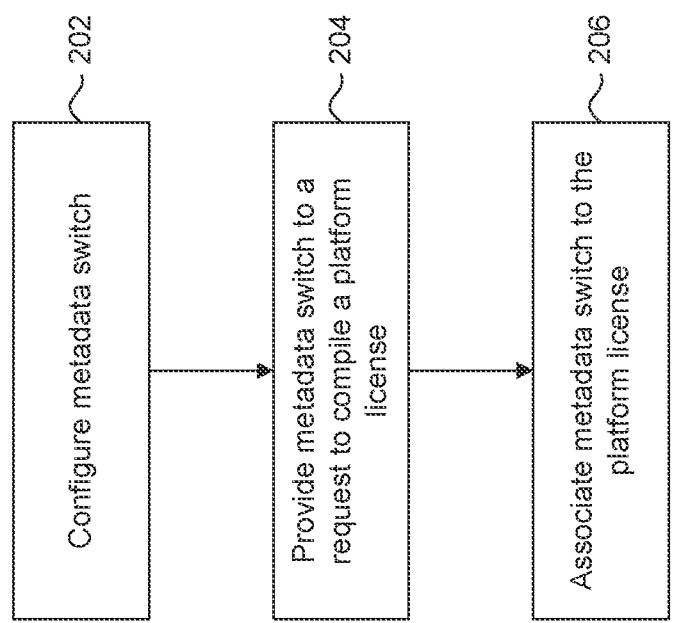
FIG. 2 is a flowchart illustrating steps for configuring and managing platform licenses and metadata switches in a software application depot, according to some aspects.

FIG. 2 is a flowchart 200 illustrating steps for configuring and managing platform licenses and metadata switches using a software application depot 104 in a computing device.

At step 202, a metadata switch can be configured in software application depot 104. In one aspect, the metadata switch may be developed and managed by a backend engineer. The metadata switch provides configuration information for a software product function. In some aspects, software application depot 104 can configure a plurality of metadata switches for one software product. In some aspects, software application depot 104 can configure a plurality of metadata switches for a plurality of software products.

The metadata switch can provide configuration information for a plurality of aspects and functionalities of a software product. The metadata switch can include a name, description, type, and owner. The type can include configuration information for an organization's permissions, preferences, values, or access to the software product. The metadata switch may provide configuration information for a tenant organization's access to a software product, preferences in a software product, limits to a software product, or store their configuration data for a software product. For example, an organization's permissions control access to features and certain aspects of security. An organization's preferences define settings that a tenant organization can configure, such as time zones or password options. An organization's values control limits to features, such as a maximum number of outbound emails per day.

At step 204, software application depot 104 provides the metadata switch in response to a request to compile a platform license that will control the software product function. In some aspects, the platform license controls software product function by providing configuration information to a metadata switch associated with the software product. In one example, the platform license can control the software product function by providing configuration information for access to a feature, behavior of a feature, or the limits of a feature by enabling, disabling, or providing a value to the feature. A feature may include any function of the software product that is configured in a metadata switch. In some aspects, the platform license provides configuration information to a plurality of metadata switches that are associated with the software product.

At step 206, software application depot 104 can associate the metadata switch to the platform license. A final platform license is generated in software application depot 104 by associating the metadata switch in software application depot 104 to the metadata switch provided in the platform license. In some embodiments, the platform license is associated to a plurality of metadata switches.

FIG. 3 depicts an example of a platform license 300 configured with metadata switches in the software application depot. In this example, the platform license enables a plurality of features by using the metadata switches. In platform license 300, lines 9-36 configure a tenant organization's permissions. Lines 10 and 11 configure permissions that allow the tenant organization to use social login. Lines 16 and 17 configure permissions that allow the tenant organization to use the quick setup panel. Lines 22 and 23 configure permissions that allow the tenant organization to use in-app live chat. Lines 28 and 29 configure permissions that allow the tenant organization to use data import v2. Lines 34 and 35 configure permissions that allow the tenant organization to use the easified home page. In platform license 300, these permissions are allowed by being set to "true" on lines 11, 17, 23, 29, and 35 respectively. For example, if line 11 is set to "false", the tenant organization does not have permission to use the social login feature. When the backend engineer makes updates to the permissions metadata switch, aspects of the platform license will not need to be updated or changed since each item in the platform license is a reference to the permissions metadata switch.

The final platform license allows a backend engineer to add, delete, or update a software product function without the need to edit every platform license that is associated with the software product function by hand. Instead, the backend engineer can add, delete, or update a metadata switch, which will effectively apply the changes to all platform licenses associated with the metadata switch.

Figure 4:
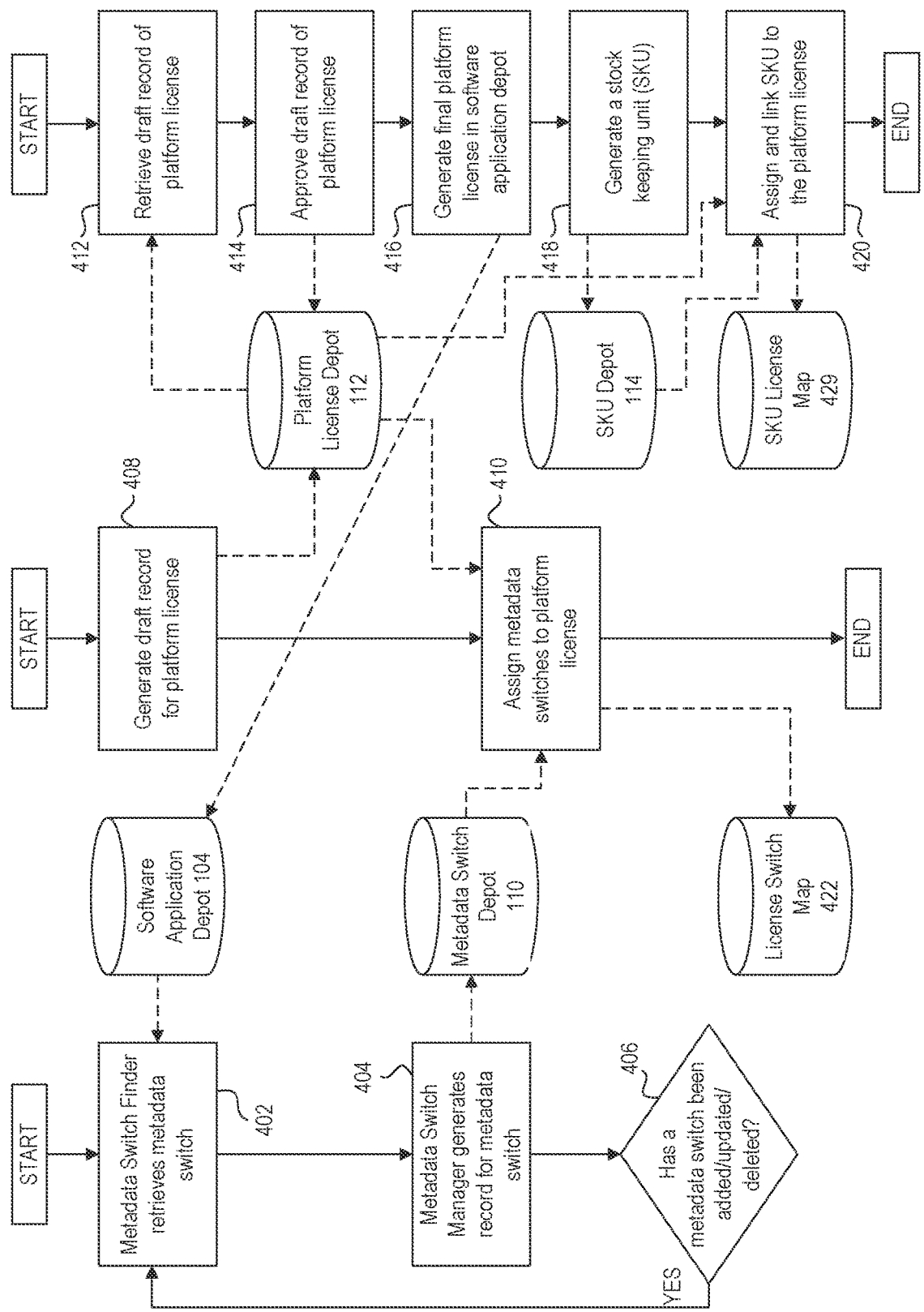
FIG. 4 is a flowchart illustrating steps for managing metadata switches and platform licenses in a managing database system, according to some aspects.

FIG. 4 is a flowchart 400 illustrating steps for managing metadata switches and platform licenses in a managing database system 108.

At step 402, a metadata switch finder (MSF) configured in managing database system 108 can retrieve a metadata switch from software application depot 104. In some aspects, the metadata switch is provided through the communication between CSP 102 and host CSP 106.

At step 404, a metadata switch manager (MSM) can generate a record for the metadata switch. In some aspects, software application depot 104 can provide the metadata switch to a request from the MSF and the MSM generates a record for the provided metadata switch. In another aspect, software application depot 104 can provide the record of the metadata switch. The record, for example, may publish a reference to the metadata switch's corresponding software product function, an owner of the software product, a metadata description of the software product function, a dependency between the software product function and the metadata switch, a categorization of the software product function, or a reference to a platform license that is associated to the software product function via the metadata switch. MSM will publish the metadata switch record to metadata switch depot 110.

At step 406, MSF will continuously check for additions, deletions, or updates made in software application depot 104. If a metadata switch is added to software application depot 104, MSF will retrieve the metadata switch and MSM will create a new record for the metadata switch to be published. If a metadata switch is deleted from software application depot 104, MSM will remove the record for the metadata switch from metadata switch depot 110. If a metadata switch is updated in software application depot 104, MSF will retrieve the updated metadata switch and MSF will update the record for the metadata switch in metadata switch depot 110.

When the record is published, the metadata switch can be used to generate a platform license.

Platform licenses are used by a managing organization to configure and control functionality of a software product for a tenant organization. The platform license, for example, can control feature access, feature behavior, or feature limits that are provided to the tenant organization. The platform licenses may be created using the record of metadata switches stored in metadata switch depot 110.

At step 408, managing database system 108 generates a draft record of a platform license for a software product. The draft platform license record may store, for example, the license name, status, revisions, a cloud service provider, a managing service provider, and a license owner. The status of the platform license record may be set to indicate that the platform license record is a draft.

In some aspects, a user from the managing organization can input a request to generate the draft platform license record. The user input can also provide configuration information for each metadata switch used in the draft platform license record. The user may input the user input with a user device (e.g., a computing device, a smart device, a mobile device, a laptop, a tablet, a set-top box, a display device, etc.). The user device may generate and/or display a page (e.g., web pages, application pages, links and/or linked data, documentation, etc.) of a user interface (e.g., website, application, data/content source, etc.).

Figure 5A:
Figure 5B:
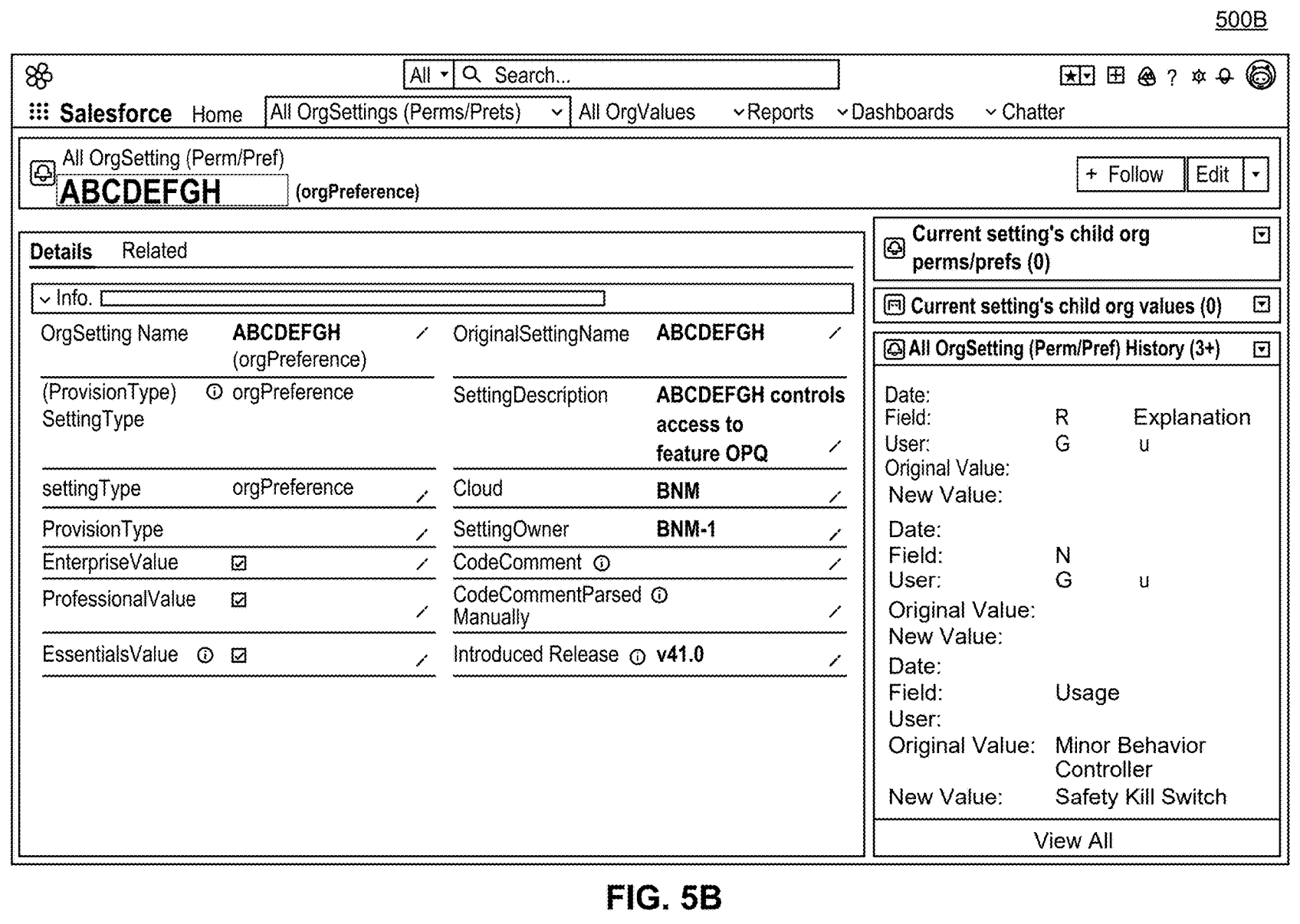
Figure 5C:
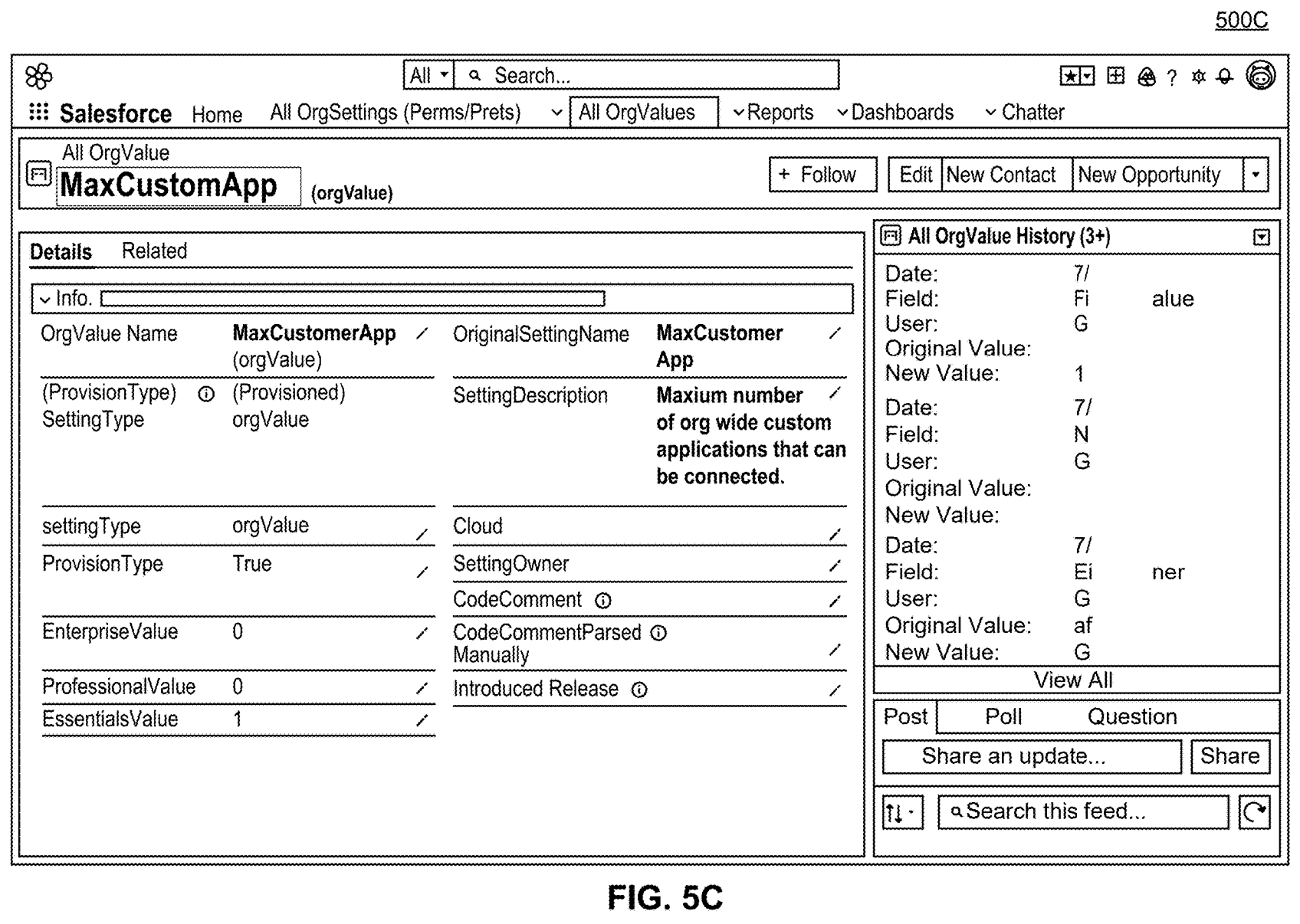

Flowchart 400 is further described with reference to FIGS. 5A-C. FIGS. 5A-C depict example user interfaces 500A, 500B, and 500C that are usable to retrieve user input for a platform license. The user interface can allow users to input configuration information for a metadata switch that will be used in a final platform license. In one aspect, the user interface can be such that a person with little to no skill in creating platform licenses can initiate the creation of a platform license with no help from an engineer. The user interface can have a page for each metadata switch that corresponds to the software product. The user interface uses the record of the metadata switch published in metadata switch depot 110 to prompt the user for configuration information for the metadata switch.

FIG. 5A depicts an example of user interface 500A that receives user input for a tenant organization's permissions to a software product function. Navigation bar 502 allows a user to choose which metadata switch configuration to edit. Details subsection 504 allows the user to edit the values for the metadata switch configuration. Current setting subsection 506 displays the current permissions and preferences for the platform license being created by the user. Current setting subsection 508 displays the current values for the platform license being created by the user. History subsection 510 displays the history of the metadata switch configurations for the platform license being created. In the depicted embodiment, the user input relates to permissions for the tenant organization to use a tool that allows a user to interact with Service Cloud providers for support.

FIG. 5B depicts an example of a user interface 500B that receives user input for a tenant organization's preferences for a software product function. In the depicted embodiment, the user input relates to the tenant organization's preference for enabling a mobile browser app.

FIG. 5C depicts an example of a user interface 500C that receives user input for a tenant organization's values. In the depicted embodiment, the user input relates to specifically how many email addresses can be connected to the software product.

After user input is received, the draft of the platform license record is generated and stored in platform license depot 112, as shown at step 408.

At step 410, managing organization database 108 can assign and link the draft platform license record to a metadata switch record that is associated with the software product. The assigned metadata switch and platform license can be linked in license switch map 422. In some aspects, a plurality of metadata switches can be assigned to the draft platform license record.

In some aspects, the managing organization will create platform licenses to be sold to tenant organizations. In some aspects, managing database system 108 can include a method to make the platform licenses accessible and marketable to tenant organizations.

At step 412, the draft platform license record may be retrieved from platform license depot 112.

At step 414, the draft platform license record is sent to a user or group of users to be reviewed. The status of the platform license may be set to indicate that the platform license record is under review. When the platform license is approved by the user or group of users, the status of the platform license record may be set to indicate that the draft platform license record is final.

At step 416, the final platform license record is provided to the software application depot 104. The platform license is associated, by software application depot 104, to the metadata switches it is assigned to in managing database system 108.

At step 418, a stock keeping unit (SKU) is generated and stored in SKU depot 114.

At step 420, the SKU stored in SKU depot 114 is assigned to the final platform license record and linked in SKU License Map 424. The platform licenses can be accessed and purchased when linked to an SKU.

FIG. 6 depicts an example of a user interface 600 that displays final platform license records and corresponding SKUs. Product column 602 displays which software products currently have platform licenses created for the software product. License Definition column 604 displays what the platform licenses configure in the software product. A user may select a platform license record to sell or purchase.

Figure 7:
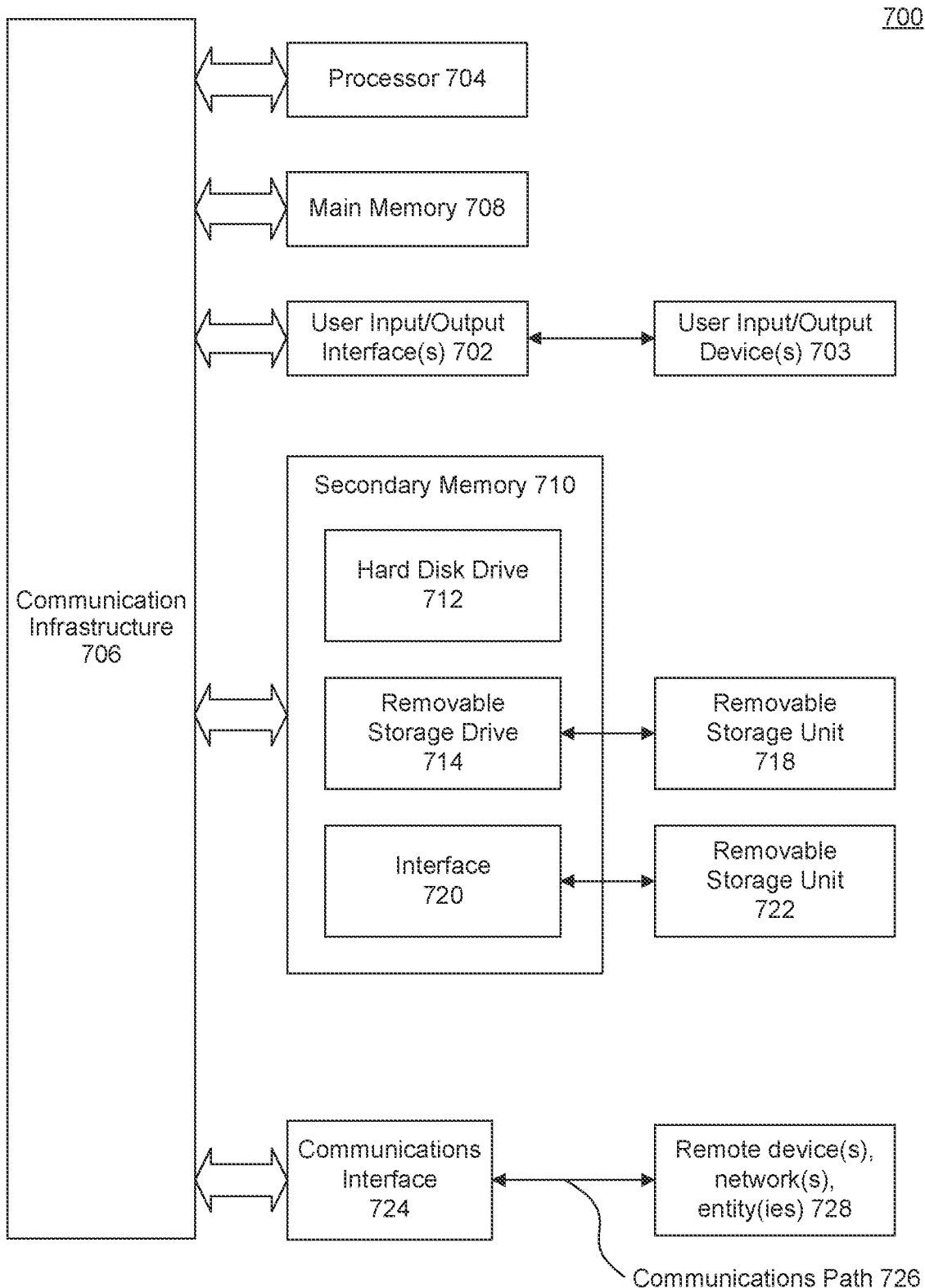
FIG. 7 illustrates a block diagram of example components of a computer system, according to some aspects.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include customer input/output device(s) 703, such as monitors, keyboards, pointing devices, etc., which may communicate with communication infrastructure 706 through customer input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (Saas), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   configuring, by one or more computing devices, a metadata switch for a software product function of a software product comprising a plurality of software product functions in a software application depot, wherein the metadata switch provides configuration information for the software product function;
   providing, by the one or more computing devices, the metadata switch responsive to a request to compile a platform license that controls the software product function, wherein the request comprises configuration information for the metadata switch obtained by a user interface, wherein the user interface publishes a metadata switch record generated in response to configuring the metadata switch, and prompts a user to provide the configuration information based on the metadata switch record; and
   associating, by the one or more computing devices, the metadata switch to the platform license in the software application depot, wherein the platform license is configured with a plurality of metadata switches from the software application depot.

2. The method of claim 1, wherein the software application depot is configured to manage the software product function by at least one of adding, updating, and deleting the metadata switch.

3. The method of claim 1, wherein the configuration information comprises permissions, preferences, and configurations corresponding to an organization relating to the software product function.

4. The method of claim 1, wherein the record for the metadata switch includes a reference to the software product function and a reference to the platform license that controls the software product function.

5. The method of claim 1, wherein the platform license that controls the software product function controls operation of a feature of the software product function.

6. The method of claim 1, further comprising:
   associating, by the one or more computing devices, a definition for the metadata switch received via a user interface with the platform license.

7. The method of claim 6, wherein the associating is responsive to confirmation of review and approval of the platform license.

8. A system comprising:
   a memory; and
   at least one processor coupled to the memory and configured to perform operations comprising:
   configuring a metadata switch for a software product function of a software product comprising a plurality of software product functions in a software application depot, wherein the metadata switch provides configuration information for the software product function;
   providing the metadata switch responsive to a request to compile a platform license that controls the software product function, wherein the request comprises configuration information for the metadata switch obtained by a user interface, wherein the user interface publishes a metadata switch record generated in response to configuring the metadata switch, and prompts a user to provide the configuration information based on the metadata switch record; and
   associating the metadata switch to the platform license in the software application depot.

9. The system of claim 8, further comprising: managing the software product function by at least one of adding, updating, and deleting the metadata switch in the software application depot.

10. The system of claim 8, wherein the configuration information comprises permissions, preferences, and configurations corresponding to an organization relating to the software product function.

11. The system of claim 8, wherein the record for the metadata switch includes a reference to the software product function and a reference to the platform license that controls the software product function.

12. The system of claim 8, wherein the platform license that controls the software product function controls operation of a feature of the software product function.

13. The system of claim 8, further comprising:
   associating a definition for the metadata switch received via a user interface with the platform license.

14. The system of claim 13, wherein the associating is responsive to confirmation of review and approval of the platform license.

15. A non-transitory computer-readable medium having instructions stored thereon that, when executed by at least one computing device, cause the at least one computing device to perform operations comprising:
   configuring a metadata switch for a software product function of a software product comprising a plurality of software product functions in a software application depot, wherein the metadata switch provides configuration information for the software product function of the software product,
   providing the metadata switch responsive to a request to compile a platform license that controls the software product function, wherein the request comprises configuration information for the metadata switch obtained by a user interface, wherein the user interface publishes a metadata switch record generated in response to configuring the metadata switch, and prompts a user to provide the configuration information based on the metadata switch record, and
   associating the metadata switch to the platform license in the software application depot, wherein the platform license is configured with a plurality of metadata switches from the software application depot.

16. The computer-readable medium of claim 15, further comprising managing the software product function by at least one of adding, updating, and deleting the metadata switch in the software application depot.

17. The computer-readable medium of claim 15, wherein the configuration information comprises permissions, preferences, and configurations corresponding to an organization relating to the software product function.

18. The computer-readable medium of claim 15, wherein the record for the metadata switch includes a reference to the software product function and a reference to the platform license that controls the software product function.

19. The computer-readable medium of claim 15, wherein the platform license that controls the software product function controls operation of a feature of the software product function.

20. The computer-readable medium of claim 15, further comprising:

associating a definition for the metadata switch received via a user interface with the platform license.

* * * * *